US006147426A

United States Patent [19]
Lepi et al.

[11] Patent Number: 6,147,426
[45] Date of Patent: Nov. 14, 2000

[54] HOUSING AND MOUNTING PORTION FOR AN ALTERNATOR

[75] Inventors: Steven Michael Lepi, Belleville; Shawn Swales, Canton, both of Mich.

[73] Assignee: Ford Global Technologies, Inc., Dearborn, Mich.

[21] Appl. No.: 09/430,576

[22] Filed: Oct. 29, 1999

[51] Int. Cl.⁷ .................................................. H02K 5/00
[52] U.S. Cl. .............................. 310/91; 310/89; 310/90; 248/678; 105/157.1
[58] Field of Search ................................. 310/91, 89, 90; 248/678, 651, 657, 666, 674, 635; 105/157.1, 136, 54, 35

[56] References Cited

U.S. PATENT DOCUMENTS

| | | |
|---|---|---|
| 4,849,665 | 7/1989 | Kitamura et al. . |
| 4,980,589 | 12/1990 | Ochi et al. ............................. 310/68 D |
| 5,210,453 | 5/1993 | Nelson . |
| 5,394,039 | 2/1995 | Suchdev et al. .......................... 310/51 |
| 5,397,950 | 3/1995 | Norbury, Jr. et al. ..................... 310/91 |
| 5,686,773 | 11/1997 | Sakakibara et al. ....................... 310/91 |
| 5,696,415 | 12/1997 | Fujimoto et al. ......................... 310/89 |
| 5,760,513 | 6/1999 | Morishita et al. ........................ 310/91 |
| 5,914,549 | 6/1999 | Adachi et al. ............................ 310/89 |

FOREIGN PATENT DOCUMENTS 4-351442  12/1992  Japan .

*Primary Examiner*—Nestor Ramirez
*Assistant Examiner*—Thanh Lam

[57] ABSTRACT

An alternator 14 includes a stator housing 18 that has a longitudinal axis. A mounting portion is coupled to the stator housing 18 to couple the alternator 14 to the engine 12. The portion has a first securing portion 36 and a second securing portion 38 on an opposite side of the stator housing 18 than the first securing portion 36. The first and second securing portions have a respective through channel 40, 42 extending in a direction substantially perpendicular to the longitudinal axis 24. The first securing portion 36 and second securing portion 38 are coupled together with a bridge 44 positioned around at least a portion of the housing 18.

22 Claims, 4 Drawing Sheets

ХОUSING AND MOUNTING PORTION FOR AN ALTERNATOR

TECHNICAL FIELD

The present invention is directed to the field of alternator generators, and more specifically to a construction reducing operating noise generated in such devices.

BACKGROUND

Alternators and generators of conventional designs are mounted to an engine of an automotive vehicle to generate electricity and recharge the battery. The rotation of the rotor with respect to the stator generates electricity. The speed of the rotor is proportional to the speed of the engine because the alternator is belt driven by the engine.

One drawback to the rotating rotor is that at speeds of around 1,000 to 2,000 rpms, objectionable noise may be generated. Specifically, it has been found that at certain speeds associated with the engine idle speed (at about 1,000 to 3,000 rpms) a noise corresponding to a frequency 36 times the alternator speed, i.e., $36^{th}$ order noise, is generated. The excessive $36^{th}$ order noise in the idle speed range is due to the fact that $36^{th}$ order magnetic forces, acting upon the stator teeth, induce certain types of vibrational modes in the alternator housing. These certain types of modes are highly efficient in producing noise. In addition to the $36^{th}$ order forces, magnetic forces of other orders exist, and many other modes of vibration are excited. However, $36^{th}$ order forces tend to excite modes that are very noisy, and this noise is most audible at idle, when the engine and other accessories are relatively quiet. It would therefore be desirable to eliminate or reduce the noise generated by the alternator.

SUMMARY OF THE INVENTION

The present invention is intended to reduce the level of audible noise produced by an electrical alternator.

In one aspect of the invention, a stator housing for an alternator has a longitudinal axis. A mounting portion is coupled to the stator housing to couple the alternator to the engine. The mounting portion has a first securing portion and a second securing portion on an opposite side of the stator housing than the first securing portion. The first and second securing portions have a through channel extending in a direction substantially perpendicular to the longitudinal axis. The first securing portion and second securing portion are coupled together with a bridge positioned around at least a portion of the housing.

In a further aspect of the invention, the mounting pads are located on the first and second securing portions. The mounting pads provide a contact location between the securing portion and the engine.

One advantage of the invention is that $36^{th}$ order magnetic noise has been reduced.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
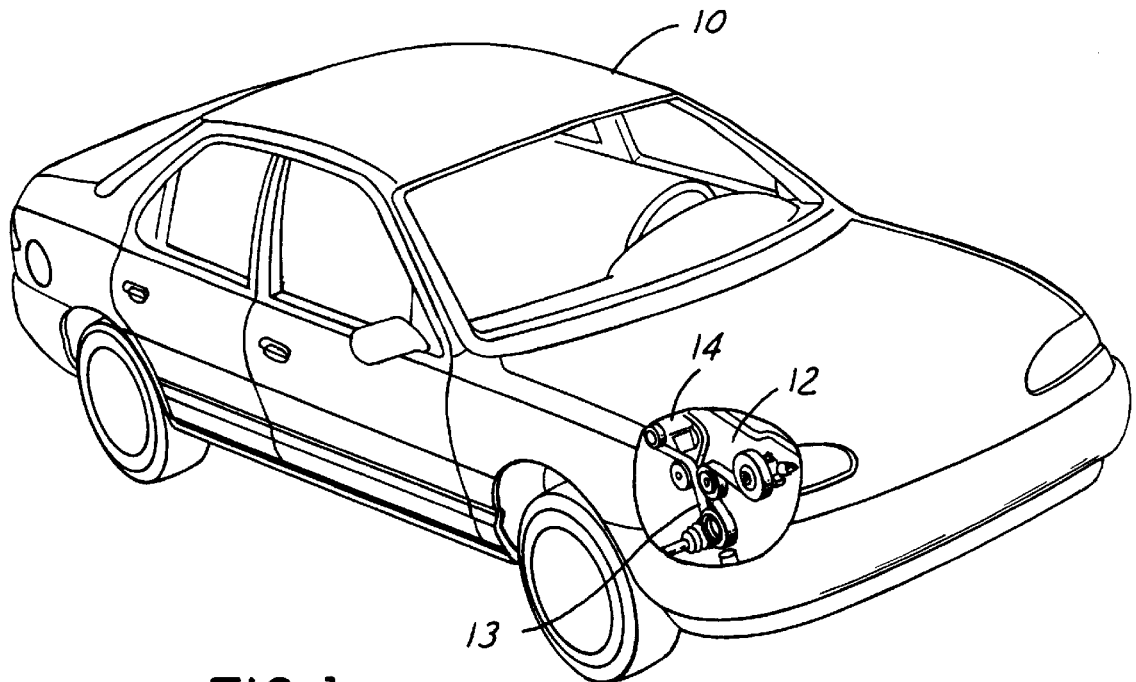
FIG. 1 is a perspective view of an automotive vehicle having an alternator.

In the following figures, the same reference numerals will be used to identify the same components of the various views. The present invention is particularly directed to reducing $36^{th}$ order magnetic noise in an alternator. However, the present invention may also reduce other types of noise and may also be suitable for other rotating electrical machines.

Referring now to FIG. 1, an automotive vehicle 10 has an engine 12 with an alternator 14 coupled thereto. Engine 12 has a belt 13 that is used to rotate the alternator 14. The rotating alternator 14 is used to generate electrical energy for the vehicle 10.

Figure 2:
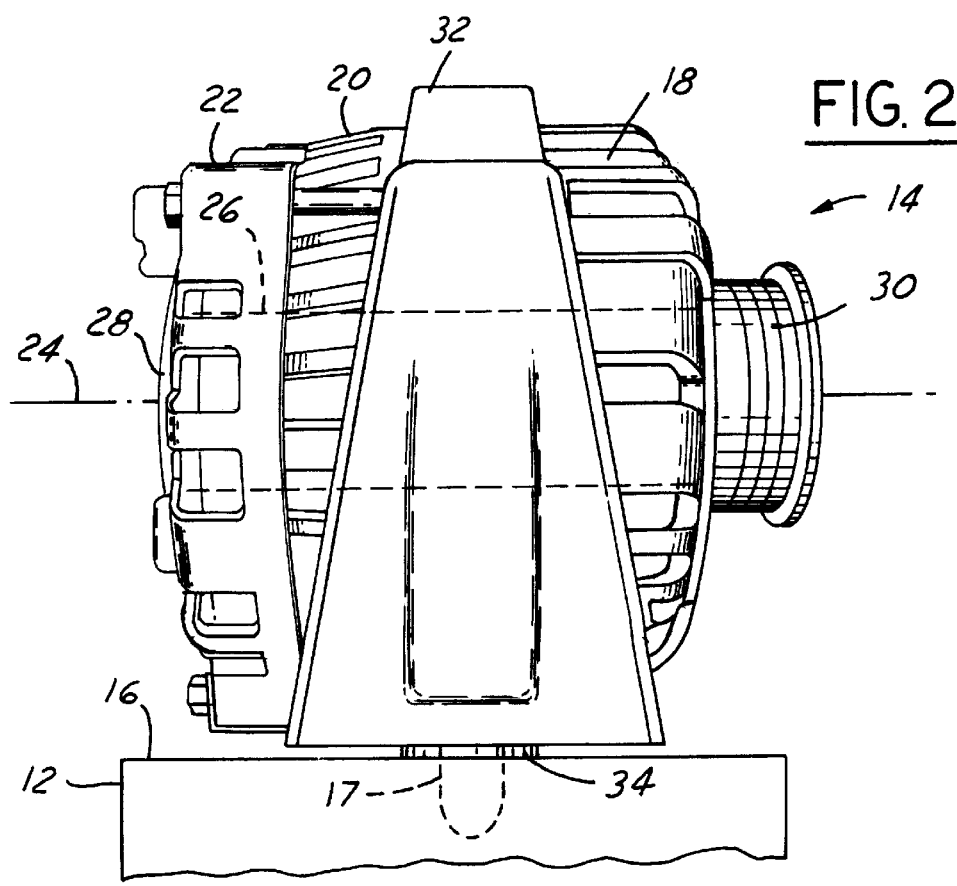
FIG. 2 is a side view of an alternator having a stator housing formed according to the present invention.

Referring now to FIG. 2, a portion of engine 12 is shown having a flat portion 16 against which alternator 14 is mounted. A bolt 17 or other fastener may be used to secure alternator 14 to engine 12.

Alternator 14 is shown having a stator housing comprised of a plurality of hollow elements 18, 20 and 22. Housing element 18 is a generally cup-shaped casting about a central axis 24. Housing element 12 retains a relatively fixed stator assembly (not shown) and also surrounds a rotor (not shown) mounted on shaft 26. The shaft 26 is supported for rotation in the hollow element 18 and in a bearing support 28. In this configuration, hollow element 18 surrounds the stator and the rotor portions of alternator 14. The rotor is rotationally driven on pulley 30 to generate alternating current. Hollow element 18 is generally cylindrically shaped and is mated along its edge to hollow elements 20 and 22.

A mounting portion 32 is circumferentially positioned at least a portion around hollow element 18. As will be illustrated below, mounting portion 32 may have mounting pads 34 positioned between mounting portion 32 and engine 12. Mounting portion 32 is preferably integrally formed with hollow element 18. However, mounting portion 32 may be a separate component.

Figure 3:
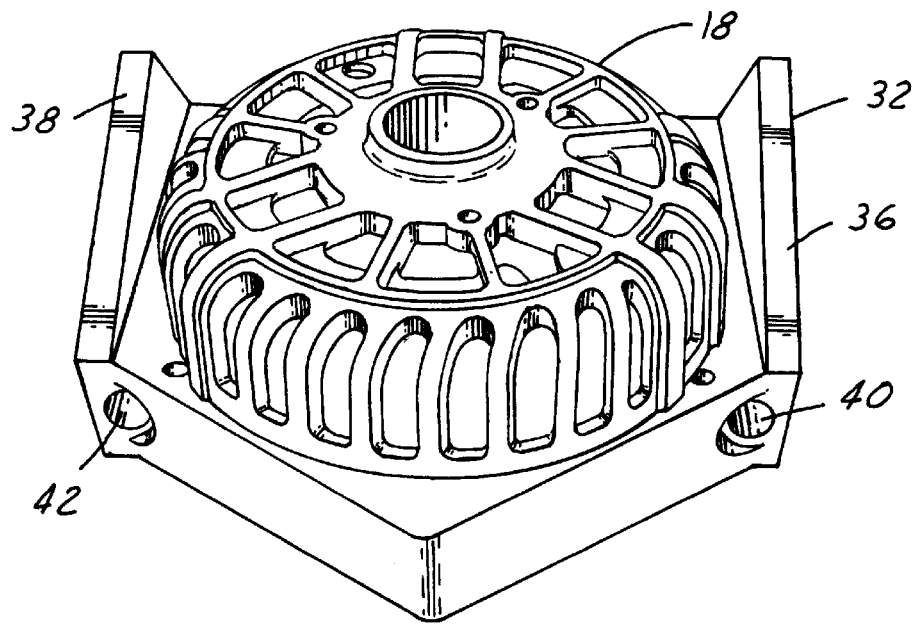
FIG. 3 is a perspective view of a stator housing formed according to the present invention.
Figure 4:
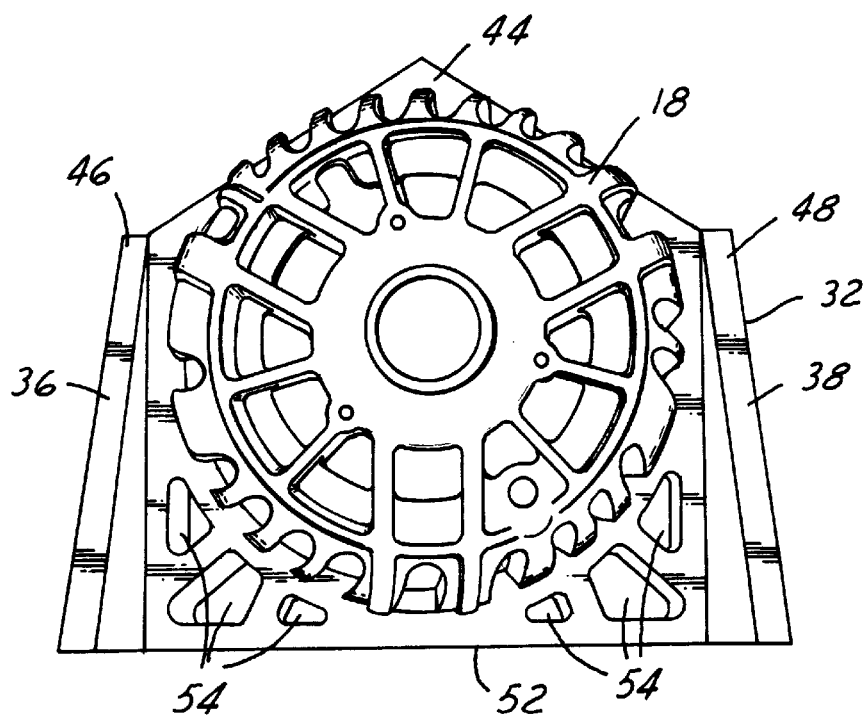
FIG. 4 is a side view of the stator housing of FIG. 3.
Figure 5:
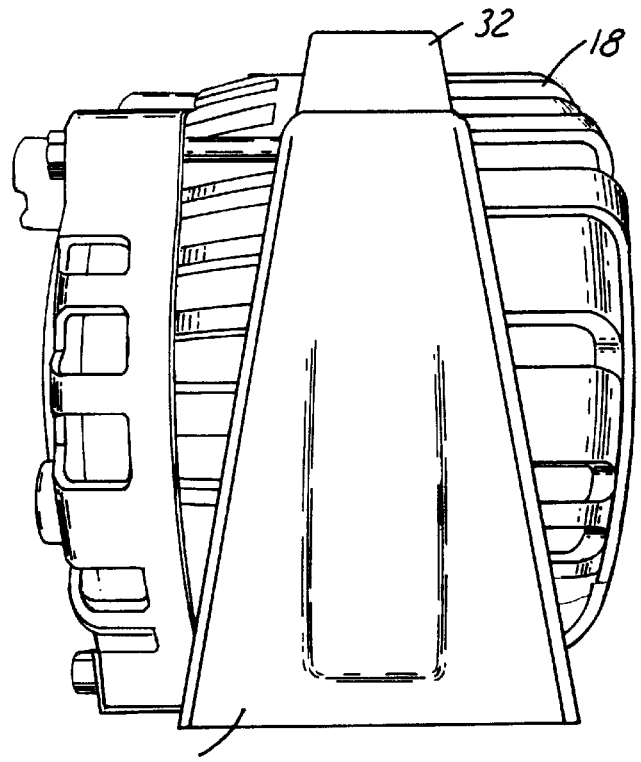
FIG. 5 is a side view of the stator housing of FIG. 3.

Referring now to FIGS. 3, 4, and 5, mounting portion 32 is illustrated as having a generally pentagonal shape and extends completely around hollow element 18. Other suitable shapes would be evident to those skilled in the art. Mounting portion 32 has a first securing portion 36 and a second securing portion 38 positioned on opposite sides of hollow element 18.

Figure 6:
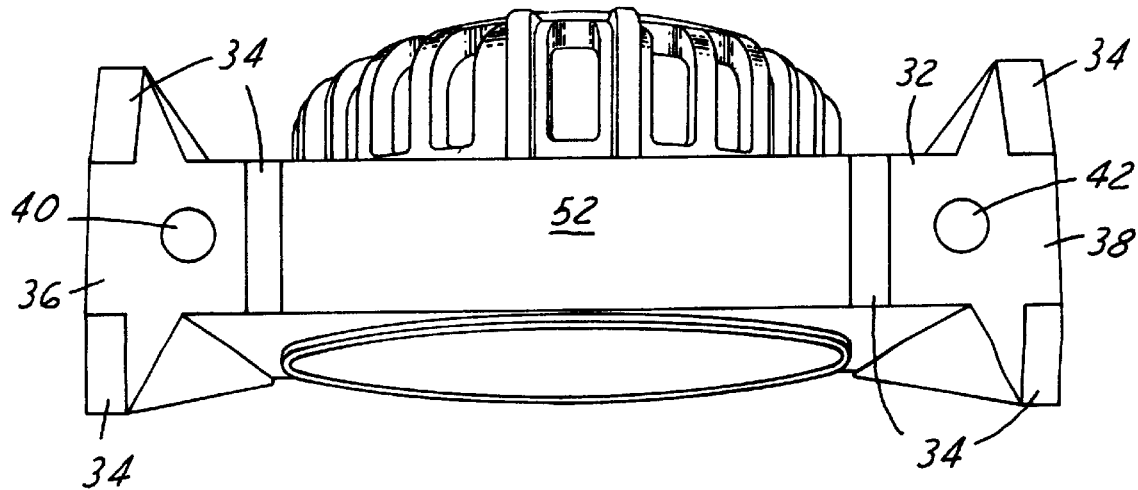
FIG. 6 is an end view of the alternator housing of FIG. 4.

First securing portion 36 and second securing portion 38 are generally triangular in shape in two dimensions. As best shown in FIG. 5, an end view of first securing portion 36 is generally triangular in shape. Also, as is best shown in FIG. 6, an end view of first securing portion 36 and second securing portion 38 have a respective first through channel 40 and a second through channel 42. The first through channel 40 and second through channel 42 are located on opposite sides of hollow element 18 and are used for securing the mounting portion 32 and thus the alternator 14 to engine 12. That is, first securing portion 36 and second securing portion 38 are radially opposite each other. First through channel 40 and second through channel 42 are parallel with each other and are substantially tangential to hollow element 18. The direction of first through channel 40 and second through channel 42 is perpendicular to the central axis 24 of alternator 14 and hollow element 18.

Mounting portion 32 has a bridge portion 44 extending around a portion of hollow element 18 between first securing portion 36 and second securing portions 38. Bridge portion 44 is coupled between the upper portion 46 of first securing portion 36 and an upper portion 48 of second securing portion 38. Upper portion 46 and upper portion 48 correspond to the vertex of the triangle shape of first securing portion 36 and second securing portion 38. The bridge portion 44 corresponds to the top of the generally pentagonal shape of the mounting portion 32 and is positioned opposite the engine.

Mounting portion 32 has a lower portion 50 that extends at least partially around hollow element 18 on the opposite side of hollow element 18 as bridge portion 44. Lower portion 50 has a generally flat side 52 that may be positioned adjacent to engine 12. Although, for mounting purposes, flat side 52 may be spaced apart from engine 12 by mounting pads 34, as will be further described below. Lower portion 50 extends about 180° around hollow element 18.

To reduce the weight of mounting portion 32, recesses 54 having a reduced thickness may be provided. Although a total of six recesses are illustrated, a greater number of recesses to further reduce weight may be employed on mounting portion 32. However, the amount of reduction should still allow sufficient strength in portion 32. Recesses 54 may also extend completely through portion 32 to further reduce weight.

Referring now to FIG. 6, flat side 52 of mounting portion 32 is illustrated. First securing portion 36 and second securing portion 38 have mounting pads 34 positioned thereon. Each of first securing portion 36 and second securing portion 38 have three mounting pads 34 positioned in a generally triangular shape. Mounting pads 34 preferably extend about 1 millimeter from the first securing portion and second securing portion 38. Each of the mounting pads 34 is generally on the same plane to provide a mounting surface against engine 12. The area of the mounting pads 34 may vary depending on the area of engine for mounting.

First through channel 40 and second through channel 42 are preferably positioned at a centroid of the three mounting pads 34 on each respective securing portions 36, 38. The fastener is thus located at the centroid. This arrangement has been found to provide sufficient holding characteristics as well as reduced noise characteristics. It is believed that an even holding distribution is divided across pads 34.

Figure 7:
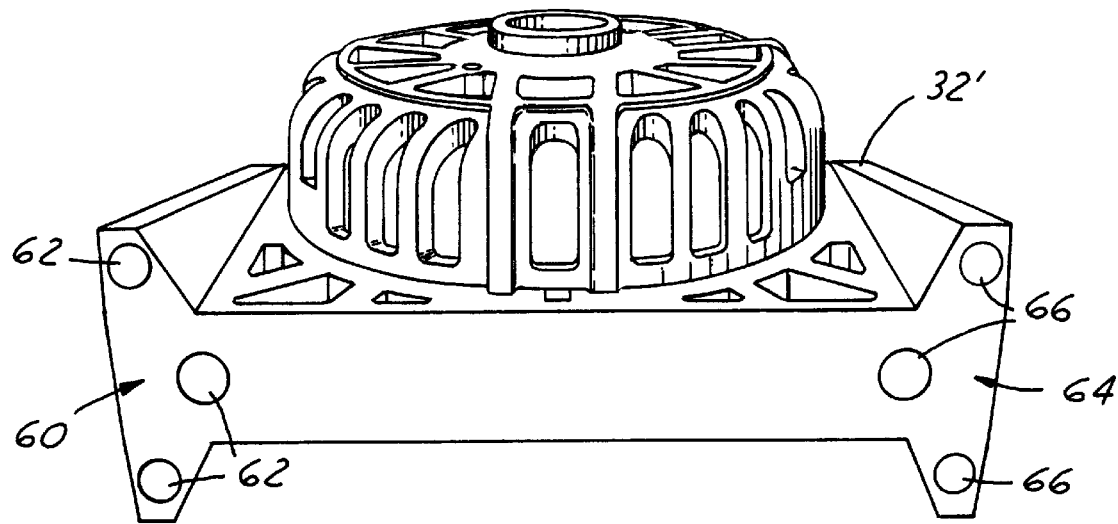
FIG. 7 is an end view of an alternative embodiment of a stator housing according to the present invention.

Referring now to FIG. 7, a perspective view of an alternative embodiment of mounting portion 32' is illustrated. In this embodiment, the mounting pads 34 from above are eliminated and the first through channel 40 and second through channel 42 have been replaced by first group 60 of three through channels 62 and a second group 64 of through channels 66. Through channels 62, 66 are preferably positioned near the corners of respective first securing portions 36 and second securing portion 38. A fastener (shown above in FIG. 2) is positioned within each through channel 62, 64 to secure alternator 14 to engine 12.

Figure 8:
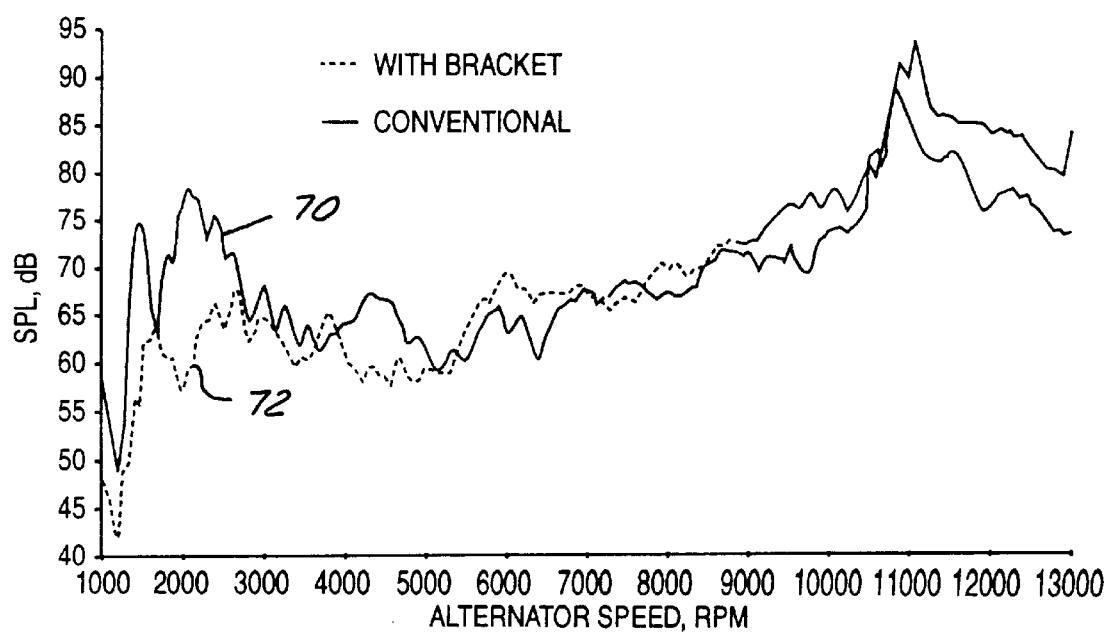
FIG. 8 is a plot of sound versus speed for an alternator not using the mounting portion of the present invention and an alternator having an improved mounting portion.

Referring now to FIG. 8, a sound level signal 70 of an alternator without the present invention is illustrated for comparison to a sound level signal 72 of an alternator according to the teachings of the present invention. As is illustrated particularly in the area between 1,500 and 3,000 rpms, the sound level, particularly $36^{th}$ order noise, is substantially reduced using the mounting portion of the present invention.

While particular embodiments of the invention have been shown and described, numerous variations and alternate embodiments will occur to those skilled in the art. Accordingly, it is intended that the invention be limited only in terms of the appended claims.

What is claimed is:

1. A rotating electrical machine comprising:

a rotor;

a stator;

a stator housing having a longitudinal axis; and a mounting portion coupled to said housing, said mounting portion having a first securing portion opposite a second securing portion on said stator housing, said first and second securing portions having a first through channel extending in a direction substantially perpendicular to said longitudinal axis, said first securing portion and said second securing portion coupled together with a bridge extending outward from said housing and positioned around a portion of said housing, wherein said first securing portion and said second securing portion have a generally triangular cross section.

2. A rotating electrical machine as recited in claim 1 wherein said mounting portion is integrally formed with said stator housing.

3. A rotating electrical machine comprising:

a rotor;

a stator;

a stator housing having a longitudinal axis; and a mounting portion coupled to said housing, said mounting portion having a first securing portion opposite a second securing portion on said stator housing, said first and second securing portions having a first through channel extending in a direction substantially perpendicular to said longitudinal axis, said first securing portion and said second securing portion coupled together with a bridge extending outward from said housing and positioned around a portion of said housing, wherein said first securing portion comprises a first set of three mounting pads and said second securing portion comprising a second set of three mounting pads.

4. A rotating electrical machine as recited in claim 3 wherein said first set of mounting pads and said second set of mounting pads are disposed substantially in a triangle.

5. A rotating electrical machine comprising:

a rotor;

a stator;

a stator housing having a longitudinal axis; and a mounting portion coupled to said housing, said mounting portion having a first securing portion opposite a second securing portion on said stator housing, said first and second securing portions having a first through channel extending in a direction substantially perpendicular to said longitudinal axis, said first securing portion and said second securing portion coupled together with a bridge extending outward from said housing and positioned around a portion of said housing, wherein said first securing portion and said second securing portion have a respective first upper portion and a second upper portion, said bridge extending between said first upper portion and said second upper portion.

6. A rotating electrical machine as recited in claim 5 wherein said first securing portion comprises a lower portion extending at least partially around said stator housing.

7. A rotating electrical machine as recited in claim 6 wherein said lower portion comprises reduced thickness area.

8. A rotating electrical machine comprising:

a rotor;

a stator;

a stator housing having a longitudinal axis; and a mounting portion coupled to said housing, said mounting portion having a first securing portion opposite a second securing portion on said stator housing, said first and second securing portions having a first through channel extending in a direction substantially perpendicular to said longitudinal axis, said first securing portion and said second securing portion coupled together with a bridge extending outward from said housing and positioned around a portion of said housing, wherein said first and second securing portions have a second through channel and a third through channel extending therethrough.

9. A rotating electrical machine comprising:

a rotor;

a stator;

a stator housing having a longitudinal axis; and a mounting portion coupled to said housing, said mounting portion having a first securing portion opposite a second securing portion on said stator housing, said first and second securing portions having a first through channel extending in a direction substantially perpendicular to said longitudinal axis, said first securing portion and said second securing portion coupled together with a bridge extending outward from said housing and positioned around a portion of said housing, wherein said first through channel, said second through channel and third through channel are disposed substantially in a triangle.

10. An alternator for mounting to an engine of an automotive vehicle comprising:

a stator housing having a longitudinal axis;

a mounting portion coupling said stator housing to the engine, said portion having a first securing portion and a second securing portion on opposite sides of said stator housing, said first and second securing portions having a first through channel extending in a direction substantially perpendicular to said longitudinal axis, said first securing portion and said second securing portion coupled together with a bridge positioned around a portion of said housing, wherein said first securing portion and said second securing portion have a generally triangular cross section.

11. An alternator as recited in claim 10 wherein said mounting portion comprises a lower portion extending at least partially around said stator housing.

12. An alternator as recited in claim 11 wherein said lower portion comprises reduced thickness area.

13. An alternator as recited in claim 10 wherein said mounting portion is integrally formed with said stator housing.

14. An alternator for mounting to an engine of an automotive vehicle comprising:

a stator housing having a longitudinal axis;

a mounting portion coupling said stator housing to the engine, said portion having a first securing portion and a second securing portion on opposite sides of said stator housing, said first and second securing portions having a first through channel extending in a direction substantially perpendicular to said longitudinal axis, said first securing portion and said second securing portion coupled together with a bridge positioned around a portion of said housing, wherein said first securing portion comprises a first set of three mounting pads and said second securing portion comprising a second set of three mounting pads.

15. An alternator as recited in claim 14 wherein said first set and said second set are disposed substantially in a triangle.

16. An alternator as recited in claim 14 wherein said first through channel and said second through channel are positioned at a centroid of a respective first set of three mounting pads and a second set of three mounting pads.

17. An alternator for mounting to an engine of an automotive vehicle comprising:

a stator housing having a longitudinal axis;

a mounting portion coupling said stator housing to the engine, said portion having a first securing portion and a second securing portion on opposite sides of said stator housing, said first and second securing portions having a first through channel extending in a direction substantially perpendicular to said longitudinal axis, said first securing portion and said second securing portion coupled together with a bridge positioned around a portion of said housing, wherein said first securing portion and said second securing portion have a respective first upper portion and a second upper portion, said bridge extending between said first upper portion and said second upper portion.

18. An alternator for mounting to an engine of an automotive vehicle comprising:

a stator housing having a longitudinal axis;

a mounting portion coupling said stator housing to the engine, said portion having a first securing portion and a second securing portion on opposite sides of said stator housing, said first and second securing portions having a first through channel extending in a direction substantially perpendicular to said longitudinal axis, said first securing portion and said second securing portion coupled together with a bridge positioned around a portion of said housing, wherein said first and second securing portions have a second through channel and a third through channel extending therethrough.

19. An alternator for mounting to an engine of an automotive vehicle comprising:

a stator housing having a longitudinal axis;

a mounting portion coupling said stator housing to the engine, said portion having a first securing portion and a second securing portion on opposite sides of said stator housing, said first and second securing portions having a first through channel extending in a direction substantially perpendicular to said longitudinal axis, said first securing portion and said second securing portion coupled together with a bridge positioned around a portion of said housing, wherein said first through channel, said second through channel and third through channel are disposed substantially in a triangle.

20. An integrally formed mounting portion and stator housing assembly comprising:

a mounting portion having a first securing portion and a second securing portion on opposite sides of said stator housing, each of said first and second securing portions having three mounting pads spaced apart in a triangular shape, said first securing portion and said second securing portion having a respective first mounting channel and a second mounting channel extending in a direction substantially perpendicular to a longitudinal axis of the stator housing assembly, said first mounting channel and said second mounting channel positioned at a centroid of said three mounting pads, said first securing portion and said second securing portion coupled together with a bridge positioned around a portion of said housing.

21. An assembly as recited in claim 20 wherein said mounting portion comprises a lower portion extending at least partially around said stator housing.

22. An assembly as recited in claim 21 wherein said lower portion comprises reduced thickness area.

* * * * *